(12) United States Patent
Carloff et al.

(10) Patent No.: US 8,669,338 B2
(45) Date of Patent: Mar. 11, 2014

(54) HOMOPOLYMERS AND COPOLYMERS OF HYDROXYISOBUTYRIC ACID (ESTER) (METH) ACRYLATES

(75) Inventors: Ruediger Carloff, Darmstadt (DE); Roger Recktenwald, Bensheim (DE)

(73) Assignee: Evonik Roehm GmbH, Darmstadt (DE)

( * ) Notice: Subject to any disclaimer, the term of this patent is extended or adjusted under 35 U.S.C. 154(b) by 115 days.

(21) Appl. No.: 13/395,539

(22) PCT Filed: Sep. 7, 2010

(86) PCT No.: PCT/EP2010/063067
§ 371 (c)(1),
(2), (4) Date: Mar. 12, 2012

(87) PCT Pub. No.: WO2011/051032
PCT Pub. Date: May 5, 2011

(65) Prior Publication Data
US 2012/0172563 A1 Jul. 5, 2012

(30) Foreign Application Priority Data

Oct. 30, 2009 (DE) .......................... 10 2009 046 197

(51) Int. Cl.
*C08F 222/14* (2006.01)
*C08F 301/00* (2006.01)

(52) U.S. Cl.
USPC ...................................... 526/329.5; 526/325

(58) Field of Classification Search
USPC ....................................................... 526/329.5
See application file for complete search history.

(56) References Cited

U.S. PATENT DOCUMENTS

2011/0263806 A1 10/2011 Dietrich et al.

FOREIGN PATENT DOCUMENTS

JP 11 024274 1/1999

OTHER PUBLICATIONS

Adamus, G. et al., "Degradation behaviour of poly(methylmethacrylate-g-3-hydroxybutyrate) polymer films", Polymer Degradation and Stability, vol. 50, pp. 269-276, XP-002615061. (1995).
International Search Report issued on Jan. 12, 2011 in PCT/EP10/063067 filed on Sep. 7, 2010.
U.S. Appl. No. 13/497,631, filed Mar. 22, 2012, Schuetz, et al.

*Primary Examiner* — Vu A Nguyen
(74) *Attorney, Agent, or Firm* — Oblon, Spivak, McClelland, Maier & Neustadt, L.L.P.

(57) ABSTRACT

The invention relates to novel poly(meth)acrylates for producing moulding compositions. In particular, the invention relates to novel methacrylates having ester groups which, in the cleavage process, liberate at most only a very small amount of components which are not re-copolymerizable. Copolymerization of monomers of this type in the production of the novel poly(meth)acrylates for moulding compositions brings about only minimal alteration of the heat resistance of these materials or may indeed improve the same.

13 Claims, No Drawings

HOMOPOLYMERS AND COPOLYMERS OF HYDROXYISOBUTYRIC ACID (ESTER) (METH) ACRYLATES

FIELD OF THE INVENTION

The invention relates to novel poly(meth)acrylates for producing moulding compositions. In particular, the invention relates to novel (meth)acrylates having ester groups which, in the cleavage process, liberate at most only a very small amount of components which are not re-copolymerizable. Copolymerization of monomers of this type in the production of the novel poly(meth)acrylates for moulding compositions brings about only minimal alteration of the heat resistance of these materials or may indeed improve the same.

The terms (meth)acrylates and poly(meth)acrylates below mean derivatives of acrylic acid and of methacrylic acid, and mixtures of the abovementioned or polymers thereof.

Polymers of esters of (meth)acrylic acid are well known and are widely used. They feature in particular high optical transparency and very good weathering resistance. The heat resistance of poly(meth)acrylates is also very high in comparison with that of other polymers, and is therefore advantageous. The glass transition temperature here depends on the size of the ester group. If the ester group is an alkyl group, the heat resistance increases as the chain length of the alkyl group decreases. By way of example, the glass transition temperature of polymethyl methacrylate (differential scanning calorimetry; abbreviated to DSC hereinafter) is from 112° C. to 118° C., as a function of polymerization temperature. The glass transition temperature of poly-n-butyl methacrylate is in contrast only from about 25° C. to 30° C.

The nature of the poly(meth)acrylate can be altered in a controlled manner via suitable selection of the ester group. Most (meth)acrylates having chain-stiffening alkyl ester groups have lower thermal stability than polymethyl methacrylate (PMMA) because they have a disadvantageous tendency towards cleavage at the ester group when processing temperature is high. By way of example, therefore, in the case of cyclohexyl methacrylate, cleavage to give cyclohexene occurs at temperatures above 270° C. after just a short residence time in the machinery. The ester group removed by cleavage either remains in the polymer, and therefore in the product, or, in the case of simultaneous devolatalization during processing, is removed and collected in the form of condensate. In both instances, undesired foreign substances are produced, requiring separate assessment of product toxicology. The process cannot usually reuse the ester groups removed by cleavage.

Production of poly(meth)acrylates with high heat resistance has long been an objective of industrial research. High heat resistance not only increases extrudability or provides increased scope for processing via extrusion or other processes in the melt: it is also attended by improved properties such as increased colourfastness lifetime or high weathering resistance. Higher heat resistance also often provides greater scope in the actual production process, e.g. in the removal of volatile constituents.

PRIOR ART

EP 0 113 105 describes a mixture of PMMA and a terpolymer of maleic anhydride, α-methylstyrene and MMA. A disadvantage, alongside the necessary formulation step, is that prolonged weathering can be shown to cause embrittlement of the moulding composition.

EP 1 742 997 improves the said blend. Here, a mixture is made of PMMA and of a relatively short-chain terpolymer of maleic anhydride, styrene and MMA. However, this system is again very unsatisfactory in relation to heat resistance. Furthermore, the system comprises styrene, which the person skilled in the art knows to have an adverse effect on weathering resistance.

A combination of maleic anhydride with vinylaromatics as units in polymethacrylates is a solution frequently used to improve the thermal stability of polymethacrylate moulding compositions. However, this solution remains fundamentally inadequate, since although it can raise glass transition temperature it also requires acceptance of potential incompatibility and therefore phase separation. The effect on the problem of thermal degradation is moreover only very small. DE 295 04 693 U1 approaches this by adding organic compounds, or to be more precise organic phosphites. However, low-molecular-weight compounds have a tendency towards migration and cannot provide any relatively long-term heat stabilization.

Ideal solutions for this type of formulation problem comprise polymethacrylates modified to have heat resistance per se, without co-formulation. This can be achieved by incorporating suitable comonomers. EP 0 722 960 incorporated methacrylates having exo-methylenelactone pendant groups into PMMA moulding compositions. However, disadvantages of the said groups are hydrophilic properties and the attendant water absorption of the moulding composition.

DE 103 20 317 uses imide groups, or to be more precise imidated polymethyl methacrylates. However, a fundamental disadvantage of nitrogen-containing compounds is the discoloration that occurs on heating. At best, this can be countered by adding stabilizers.

Polymethacrylates having high methacrylic acid content have particularly good heat resistance. Copolymers of this type are difficult to produce, because of the corrosive property of methacrylic acid. When a plant for producing acid-containing poly(meth)acrylates is operated continuously, even a small proportion of (meth)acrylic acid, e.g. 1% by weight, can cause corrosion after a prolonged period of operation, and can thus increase the amount of plant maintenance required.

An interesting alternative for constructing polymers of this type is the incorporation of potentially unstable comonomers and the formation of acids therefrom by way of a polymer-analogous reaction. Copolymerization of tert-butyl (meth) acrylate and subsequent thermal decomposition is a known process. A disadvantage of the said procedure is that liberation of isobutene causes foaming of the composition. JP 11 222 460 approaches this issue by taking tricyclic, unsaturated compounds and reacting these with polymethacrylate that has been subjected to low-strength acid modification. These groups can be removed by cleavage, after polymer processing where the acid groups would cause problems, through use of high-energy radiation. However, the applicability of the said process is restricted for various reasons to a small number of fields, e.g. laser lithography. A polymer-analogous method is used to attach and remove the groups, and this process therefore remains subject to the restrictions explained for synthesis of acid-modified poly(meth)acrylates. Use of radiation for cleavage of the groups is also disadvantageous in the case of moulding compositions of relatively thick consistency. For some applications it would be preferable to carry out the cleavage process in an extruder or in a kneader during processing. This procedure would also permit easy removal of the volatile cleavage products.

JP 2000 347 410 gives a good overview of further groups that can be removed by using high-energy radiation and which form acids as product of cleavage. The materials involved here are five types of alcohols which are esterified by methacrylic acid prior to the polymerization process: monocyclic, heterocyclic, polycyclic groups, e.g. di- or tricyclic groups, ethers which have a C1 bridge to the ester group, and compounds esterified by way of a tertiary alcohol. The latter group comprises exclusively pure alkyl groups or halogen-substituted alkyl groups. These methacrylates can be copolymerized with other methacrylates. For all of the compounds, the activation processes described as following the polymerization process are exclusively those using high-energy radiation, with the disadvantages explained above.

JP 11 024 274 describes further groups which can be converted to acids by a cleavage process, and which can be incorporated, together with tricyclic groups, within polymethacrylates for applications in laser lithography. Monomers of the following type, not specified in any further detail, can inter alia be copolymerized for this purpose:

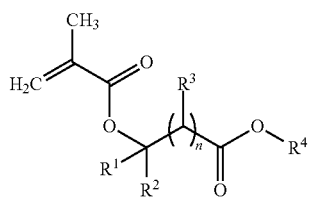

The number n here is 0 or 1, and the moieties $R^{1-3}$ are hydrogen, standard alkyl moieties, or the like, but the groups are not specified in any further detail. The only $R^4$ used is a C1, C2, or C3 moiety. Again, these units are activated only by means of high-energy radiation, and therefore only superficially, as is appropriate for the laser-lithography application. As in the examples described above, the by-products are problematic and remain within the product to cause problems or require complicated removal. If the material has been activated by radiation after processing, this removal is impossible or at best only possible at the surface.

OBJECT

It is an object of the present invention to provide novel moulding compositions which, in comparison with the prior art, have improved heat resistance and have relatively high weathering resistance, and which, in a process for bulk polymerization or solution polymerization, do not lead to any corrosion within the reactors and devolatalization apparatuses of the process.

In particular, an object is to produce moulding compositions with, in comparison with a straight PMMA moulding composition, higher glass transition temperature and improved thermal stability.

One particular aspect of the said object is also that, during the entire synthesis process, cleavage does not give rise to any further substances that are foreign to the system.

Further objects not explicitly mentioned are apparent from inspection of the entirety of the description, claims and examples below.

ACHIEVEMENT OF OBJECTS

The objects are achieved via a novel process for producing heat-resistant (meth)acrylate-based moulding compositions which is characterized by two aspects: firstly, the process gives a moulding composition composed of at least 1% by weight, preferably at least 2% by weight and particularly preferably at least 4% by weight, of repeat units of (meth)acrylic acid.

Repeat units of (meth)acrylic acid, preferably of methacrylic acid, contribute to a marked improvement in heat resistance of moulding compositions and of the mouldings produced from the said moulding compositions. As the proportion of acid rises here, there is an increase in the glass transition temperature, and an associated increase in the heat resistance of the moulding composition.

Secondly, the repeat units of methacrylic acid are obtained thermally from a prepolymer by a polymer-analogous reaction. It is preferable that the polymer-analogous reaction is cleavage to give a low-molecular-weight substance. One particular feature of the process according to the invention is that the said low-molecular-weight substance is methacrylic acid or an ester of methacrylic acid.

A further aspect is that the polymer-analogous cleavage process takes place thermally. To be more precise, the process according to the invention, in particular the polymer-analogous cleavage process, is carried out in an extruder or in a polymerization kneader. The removal of the residual monomers and/or of the remainder of the low-molecular-weight compounds liberated can also take place in the said extruder or polymerization kneader.

An advantage of the liberation of this type of compound that is analogous to or indeed identical with the monomers previously used for producing the moulding composition is that after liberation they can either be incorporated into the polymer chains or else removed from the system together with the residual monomers by distillation and, unlike other cleavage products, can be reused for the monomer synthesis process or for the polymer production process. At least 80% by weight, preferably at least 90% by weight and particularly preferably at least 95% by weight, of the amount remaining thereafter of liberated methacrylic acid and/or liberated esters of methacrylic acid is removed together with residual monomers from the moulding composition by means of subatmospheric pressure.

In this context the term prepolymer means the polymer present prior to formation of acid groups by polymer-analogous cleavage to give low-molecular-weight substances.

One particular aspect of the present invention is that the prepolymer contains repeat units of the (meth)acrylate of α-hydroxyisobutyric acid and/or of an alkyl ester of the (meth)acrylate of α-hydroxyisobutyric acid. The heat treatment forms a chain-end acid group from these by an elimination reaction, and as a function of the repeat unit, methacrylic acid or an alkyl ester of methacrylic acid is liberated.

There are two different processes for producing the prepolymer having the groups described:

In the first process, the prepolymer is produced by copolymerizing the (meth)acrylate of α-hydroxyisobutyric acid or an alkyl ester of the (meth)acrylate of α-hydroxy-isobutyric acid. This monomer accordingly has the following general formula:

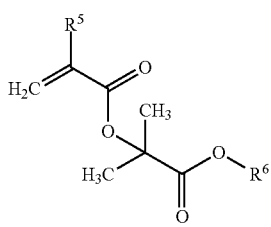

$R^5$ here is hydrogen or a methyl group, and $R^6$ is an alkyl, cycloalkyl, ether, oligoether, silyl or functional alkyl group having hydroxy, amine, silyl, acid, ester or epoxy groups.

It is preferable that $R^6$ is a simple alkyl group, such as tert-butyl, n-butyl, isopropyl, propyl, ethyl or methyl. It is very particularly preferable that it is a methyl group, the entire compound therefore being the (meth)acrylate of the methyl ester of α-hydroxyisobutyric acid. In the latter case, the thermal cleavage process according to the invention liberates MMA.

In one particular embodiment of the invention, the moiety $R^6$ involves one or more additionally esterified α-hydroxyisobutyric acid groups. By way of example here, (meth)acrylic acid can have been esterified with from one to four further molecules of α-hydroxyisobutyric acid. In the case of a plurality of esterification stages, the molecule last esterified can alternatively also involve an alkyl ester of α-hydroxyisobutyric acid.

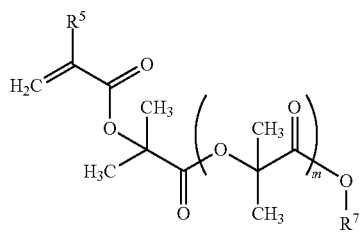

In this case, m is a number from 0 to 10, preferably from 0 to 4 and particularly preferably 0. $R^7$ corresponds to $R^6$ with the restriction that further repeat units of α-hydroxyisobutyric acid have been excluded.

It is also possible to use mixtures of various methacrylates esterified with (esters of) α-hydroxyisobutyric acid. This is relevant not only to the optional ester group $R^6$ or $R^7$ but also to the number of repeat units of α-hydroxyisobutyric acid.

As an alternative to this, there is a second process for producing the prepolymer. This process takes place by a polymer-analogous route, like the cleavage process according to the invention, in that the prepolymer is produced by esterification of a (meth)acrylic-acid-containing polymethacrylate with α-hydroxyisobutyric acid or with an alkyl ester of α-hydroxyisobutyric acid, preferably the methyl ester of α-hydroxyisobutyric acid.

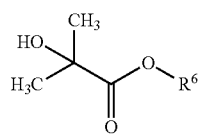

$R^6$ can represent groups and, respectively, di- or oligomers identical with those stated for the first process.

Various reactions can be used both for monomer synthesis in the first production process for the prepolymer and for the polymer-analogous reaction of the second production process. Processes that can be used are not only acid- or base-catalysed esterification but also transesterification for example of MMA or tert-butyl methacrylate or reaction with an acyl halide, such as (meth)acryloyl chloride or reaction with (meth)acrylic anhydride.

When a transesterification process is used, transesterification catalysts can be added in order to increase conversion in the polymer-analogous reaction. Surprisingly, it has been found that the continued presence of the said catalysts within the product promotes hydrolysis in the cleavage reaction at higher temperatures. To this end, it is also possible to add transesterification catalysts of this type to other prepolymers according to the invention which have been obtained by the first production process or by an esterification reaction. Examples of transesterification catalysts that can be used are LiOH, LiOCH$_3$, LiNH$_2$, CaO, Ca(OH)$_2$, NaOH, NaOCH$_3$, basic ion exchangers, acidic ion exchangers, isopropyl titanate, isobutyl titanate, titanium hydroxide, titanium dioxide, dioctyltin oxide, dibutyltin oxide, and sulphuric acid.

The first production process for the prepolymers is preferable to the second.

A further aspect of the moulding composition according to the invention is that the moulding composition is composed of at least 1% by weight, preferably at least 2% by weight and particularly preferably at least 4% by weight, of units of (meth)acrylic acid. At least 60%, preferably at least 80%, of the said units are obtained by the polymer-analogous cleavage process according to the invention. It is of no relevance here whether the prepolymer has been provided by the first or the second production process.

The poly(meth)acrylate moulding compositions according to the invention are also composed of units known to the person skilled in the art. The nature of the material, e.g. polarity, water absorbency, optical properties, or feel, can be adjusted via selection of various repeat units.

The methacrylate-based moulding compositions according to the invention are obtained from at least 40% by weight, preferably at least 60% by weight and particularly preferably at least 80% by weight, of methacrylate-based monomers.

The moulding compositions can comprise, alongside MMA and the thermally unstable monomers according to the invention, a number of comonomers. By way of example, it is possible to use methyl (meth)acrylate, ethyl (meth)acrylate, propyl (meth)acrylate, isopropyl (meth)acrylate, butyl (meth)acrylate, isobutyl (meth)acrylate, tert-butyl (meth)acrylate, hexyl (meth)acrylate, heptyl (meth)acrylate, 2-ethylhexyl (meth)acrylate, cyclohexyl (meth)acrylate, octyl (meth)acrylate, isooctyl (meth)acrylate, decyl (meth)acrylate, benzyl (meth)acrylate, tetrahydrofurfuryl (meth)acrylate, octadecyl (meth)acrylate, dodecyl (meth)acrylate, tetradecyl (meth)acrylate, oleyl (meth)acrylate, 4-methyl-phenyl (meth)acrylate, benzyl (meth)acrylate, furfuryl (meth)acrylate, cetyl (meth)acrylate, 2-phenylethyl (meth)acrylate, isobornyl (meth)acrylate, neopentyl (meth)acrylate, vinyl methacrylate, hydroxyethyl methacrylate, methacrylamide, n-isopropylmethacrylamide, or a mixture of two or more of the monomers listed.

In addition to the (meth)acrylates listed, the moulding compositions can also be composed of other monomers which are not based on (meth)acrylic acid but are copolymerizable with these materials. Examples of these are styrene, α-methylstyrene, norbornene, cyclohexylmaleimide, itaconic acid or maleic anhydride.

Both of the lists, the list of the (meth)acrylates and the list of the monomers copolymerizable with (meth)acrylates, have the nature of examples and do not in any way restrict the present invention.

Methacrylates are preferable to acrylates for producing moulding compositions, because of relatively high glass transition temperatures. However, the moulding compositions can comprise small amounts of acrylates for additional thermal stabilization. Repeat units of acrylate have a higher ceiling temperature than repeat units of methacrylate and with this exhibit better stability with respect to thermal depolymerization, in particular at the ends of the chains. Moulding compositions of this type can have up to 20% by weight, preferably up to 10% by weight, of repeat units of acrylate. The repeat units of acrylate can by way of example also entirely or to some extent be realized by use of the process according to the invention in the form of repeat units of acrylic acid.

The moulding compositions according to the invention can preferably be produced by means of a bulk polymerization process. It is particularly preferable that the moulding compositions are produced by a continuous bulk polymerization process. This can be carried out in one or more extruders or kneaders.

The polymerization process is generally initiated by adding free-radical polymerization initiators. The free-radical polymerization initiators are preferably lipophilic, in order that they dissolve in the bulk polymerization mixture. Among compounds that can be used are not only the traditional azo initiators, such as azoisobutyronitrile (AIBN) and 1,1-azobis-cyclohexanecarbonitrile, but also inter alia aliphatic peroxy compounds, e.g. tert-amyl peroxyneodecanoate, tert-amyl peroxypivalate, tert-butyl peroxypivalate, tert-amyl 2-ethylperoxyhexanoate, tert-butyl 2-ethylperoxyhexanoate, tert-amyl 3,5,5,-trimethyl-peroxyhexanoate, ethyl 3,3-di(tert-amylperoxy)butyrates, tert-butyl perbenzoate, tert-butyl hydroperoxide, decanoyl peroxide, lauryl peroxide, benzoyl peroxide, tert-butyl perneodecanoate, and any desired mixtures of the compounds mentioned. Among the abovementioned compounds, very particular preference is given to AIBN.

Initiation can alternatively also take place with use of known photoinitiators by irradiating with UV radiation or the like. It is possible here to use the familiar compounds obtainable commercially, e.g. benzophenone, α,α-diethoxy-acetophenone, 4,4-diethylaminobenzophenone, 2,2-dimethoxy-2-phenylacetophenone, 4-isopropylphenyl 2-hydroxy-2-propyl ketone, 1-hydroxycyclohexyl phenyl ketone, isoamyl p-dimethylaminobenzoate, methyl 4-dimethylaminobenzoate, methyl o-benzoylbenzoate, benzoin, benzoin ethyl ether, benzoin isopropyl ether, benzoin isobutyl ether, 2-hydroxy-2-methyl-1-phenylpropan-1-one, 2-isopropylthioxanthone, dibenzosuberone, 2,4,6-trimethylbenzoyl-diphenylphosphine oxide, bisacylphosphine oxide, and others, and these photoinitiators mentioned can be used alone or in combinations of two or more or in combination with any of the above polymerization initiators.

The amount of the initiators can vary widely. By way of example, preferred amounts used are in the range from 0.01 to 5% by weight, based on the weight of the entire composition. It is particularly preferable to use amounts in the range from 0.01 to 2% by weight, in particular amounts in the range from 0.01 to 0.5% by weight, in each case based on the weight of the entire composition.

The molecular weights of the moulding compositions can be adjusted by polymerizing the monomer mixture in the presence of chain-transfer agents, also known as chain-transfer reagents, particular examples being the mercaptans known for this use, e.g. n-butyl mercaptan, n-octyl mercaptan, n-dodecyl mercaptan, 2-mercaptoethanol, methyl 3-mercaptopropionate and 2-ethylhexyl thioglycolate. The amounts generally used here of the chain-transfer agents are from 0.01 to 5% by weight, based on the monomer mixture, preferably from 0.01 to 2% by weight and particularly preferably from 0.02 to 1% by weight (cf. by way of example H. Rauch-Puntigam, Th. Völker, "Acryl- and Methacrylverbindungen" [Acrylic and methacrylic compounds], Springer, Heidelberg, 1967; Houben-Weyl, Methoden der organischen Chemie [Methods of organic chemistry], Volume XIV/1, Page 66, Georg Thieme, Heidelberg, 1961, or Kirk-Othmer, Encyclopedia of Chemical Technology, Vol. 1, Pages 296ff., J. Wiley, New York, 1978). It is preferable to use n-dodecyl mercaptan, octyl mercaptan, mercaptoethanol or methyl 3-mercaptopropionate as chain-transfer agent.

Particular mechanical properties are necessary for some applications of the moulding compositions according to the invention. The impact resistance of moulding compositions that can serve for production of the polymethyl methacrylate moulding can be improved by the presence of from 1% by weight to 30% by weight, preferably from 2% by weight to 20% by weight, particularly preferably from 3% by weight to 15% by weight, in particular from 5% by weight to 12% by weight, of an impact modifier, which provides an elastomer phase made of crosslinked polymer particles.

The impact modifier can be obtained in a manner known per se by suspension polymerization or by emulsion polymerization. Preferred impact modifiers provide crosslinked particles with average particle size in the range from 50 to 1000 nm, preferably from 60 to 500 nm and particularly preferably from 80 to 120 nm.

Particles of this type can by way of example be obtained by free-radical polymerization of mixtures which generally comprise at least 40% by weight, preferably from 50% by weight to 70% by weight, of methyl methacrylate, from 20% by weight to 80% by weight, preferably from 25% by weight to 35% by weight, of butyl acrylate, and also from 0.1% by weight to 2% by weight, preferably from 0.5% by weight to 1% by weight, of a crosslinking monomer, e.g. of a polyfunctional (meth)acrylate, e.g. allyl methacrylate, with comonomers capable of copolymerization with the abovementioned vinyl compounds. Among the preferred comonomers are inter alia $C_1$-$C_4$-alkyl (meth)acrylates, such as ethyl acrylate or butyl methacrylate and preferably methyl acrylate, or other monomers capable of vinylic polymerization, e.g. styrene. The mixtures used to produce the abovementioned particles can preferably comprise from 0% by weight to 10% by weight of comonomers, preferably from 0.5% by weight to 5% by weight.

Particularly preferred impact modifiers are polymer particles which have a two-layer, or particularly preferably three-layer, core-shell structure. Core-shell polymers of this type have been described inter alia in EP 0 113 924, EP 0 522 351, EP 0 465 049 and EP 0 683 028.

The core, and also the shells, can respectively comprise not only the abovementioned monomers but also further monomers. These have been described above, and particularly preferred comonomers have crosslinking action.

The particle size of the impact modifiers is usually in the range from 50 to 1000 nm, preferably from 100 to 500 nm and particularly preferably from 150 to 450 nm, without any intended resultant restriction.

The moulding compositions according to the invention are processed to give mouldings. Suitable processes for this are familiar in industry, examples being injection moulding, extrusion, compression moulding, sintering, and also other shaping processes. There are no restrictions on the shape of the mouldings. The main field of application of the mouldings is based on their high heat resistance and naturally involves mouldings exposed to high temperatures, for example in optically conductive applications, optically conductive sheets or optical lenses in lighting, other examples being moulded parts in high-temperature regions of motor vehicles, e.g. headlamp lenses, rear lights or fog lights, inter alia.

A further aspect of the present invention is provided by the mouldings obtainable from the moulding compositions produced according to the invention. This aspect in particular provides mouldings obtained from moulding compositions which are composed of at least 40% by weight of repeat units of (meth)acrylic acid.

This aspect also provides mouldings obtained from moulding compositions according to the invention, or from moulding compositions obtained by the process according to the invention, where these have yellowness indices <2 and haze <1.5%, preferably <1%.

The same mouldings can feature transparency in the range from >89% to 92%, preferably from >90.5% to 92%.

Performance advantages are important for these applications. By way of example, the moulding according to the invention is practically colourless after the process of the invention. Its yellowness index or YI—measured to DIN 6167 (D65/10) or to ASTM D1925—is less than 2, preferably less than 1, measured on a specimen of thickness 3 mm. The moulding can be pigmented by the methods known to the person skilled in the art, using colour pigments.

The moulding compositions according to the invention are also used in producing moulded parts to stringent optical specifications. High processing temperatures are specifically necessary where flow paths are particularly long and/or the geometries of moulded parts are particularly complicated.

The invention also provides mouldings obtainable from the moulding compositions obtainable by the process described above.

Mouldings made of the said material can have long-term exposure to markedly higher temperatures than mouldings made of other high-transparency thermoplastics, e.g. polymethyl methacrylate (PMMA). The higher level of thermal stress naturally also increases the risk of discoloration. If these high-performance thermoplastics are to be useful in applications such as lamp covers and LED covers, they have to have maximum resistance to thermal discoloration, discernible in the form of an increase in yellowness index.

In an advantageous embodiment, a moulding of the invention is characterized in that its transparency is in the range from >89% to 92%, preferably from >90.5% to 92%.

There are further applications in the use of the moulding compositions obtained by the process described here in the coextrusion process, e.g. in the form of coextrusion layer or coating, or in the form of component in a polymer blend. Another application is provided by covers of photovoltaic cells.

EXAMPLES

α-HIBSM-MA hereinafter means the esterification product of methacrylic acid with the methyl ester of α-hydroxyisobutyric acid in accordance with the drawing below (m=0):

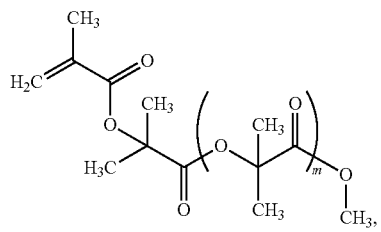

Correspondingly, dimeric α-HIBSM-MA means an esterification product where m=1. For oligomeric α-HIBSM-MA, m>1.

Example 1

Free-radical Polymerization of a Solution Composed of (All Percentages are Based on the Liquid Contents of the Initial Composition)

a.) Monomers (50% by Weight)
Methyl methacrylate: 42% by weight
Methyl acrylate: 0.5% by weight
α-HIBSM-MA solution: 7.5% by weight (composed of 80% by weight of α-HIBSM-MA and 10% by weight of dimeric α-HIBSM-MA and 10% by weight of oligomeric α-HIBSM-MA)
b.) Solvent (50% by Weight)
Butyl acetate: 50% by weight The initiator used comprised 0.9% by weight of tert-butyl perneodecanoate and the chain-transfer reagent used comprised 0.24% by weight of methyl 3-mercaptopropionate, based in each case on the liquid contents of the solution. The reaction mixture was polymerized for 6 hours with initiator feed at 80° C. Volatile constituents were then removed from the polymer syrup in a vented extruder. The product is clear.

In order to investigate the cleavage products resulting from thermal stress, a specimen produced by the process described above was heated in a TGA (Thermal Gravimetric Analysis) system at 270° C. for a period of 15 minutes, and weight loss was measured.

GC and GC-MS were also used to investigate the composition of the gaseous and solid cleavage products.

Loss of mass after 15 minutes amounted to 12% by weight. The following components were identified as cleavage products:
77% by weight of methyl methacrylate
14% by weight of α-HIBSM-MA
1.4% by weight of dimeric α-HIBSM-MA
7.4% by weight of other components Polymer-bonded acid was found within the polymer after the heating process. Based on methacrylic acid, this corresponds to a proportion of 5% by weight of methacrylic acid in the polymer. This value is in very good agreement with the value expected from the cleavage products.

The glass transition temperature to DIN ISO 11357-2 of copolymer, determined by DSC, is 114° C. prior to the heating process and 118° C. after heating at 270° C. for 15 minutes.

Example 2

Free-radical Polymerization of a Solution Composed of
a.) Monomers (50% by Weight)
Methyl methacrylate: 49.5% by weight
Methyl acrylate: 0.5% by weight
b.) Solvent (50% by Weight)
Butyl acetate: 50% by weight The initiator used comprised 0.9% by weight of tert-butyl perneodecanoate and the chain-transfer reagent used comprised 0.24% by weight of methyl 3-mercaptopropionate, based in each case on the liquid contents of the solution. The reaction mixture was polymerized for 6 hours with initiator feed at 80° C. Volatile constituents were then removed from the polymer syrup in a vented extruder. The product is clear.

The glass transition temperature determined by DSC as in Example 1 was 114° C.

The glass transition temperature remained at 114° C. after heating at 270° C. for 15 minutes and removal of volatile constituents.

The invention claimed is:

1. A process for producing a heat-resistant methacrylate-based molding composition, the process comprising:
    thermally cleaving a prepolymer in a polymer-analogous cleavage, to obtain a low-molecular-weight substance, which is methacrylic acid or an ester of methacrylic acid
    wherein the molding composition comprises at least 1% by weight of repeat units of (meth)acrylic acid, and
    at least 60% of the repeat units of (meth)acrylic acid in the molding composition are obtained by a process comprising the polymer-analogous cleavage.

2. The process of claim 1, further comprising:
    copolymerizing (meth)acrylate of α-hydroxyisobutyric acid or an alkyl ester of (meth)acrylate of α-hydroxyisobutyric acid, to obtain the prepolymer.

3. The process of claim 1, further comprising:
    esterifying or transesterifying a (meth)acrylic acid or a polymethacrylate comprising an ester of (meth)acrylic acid, with α-hydroxyisobutyric acid or an alkyl ester of α-hydroxyisobutyric acid, to obtain the prepolymer.

4. The process of claim 1, further comprising:
    preparing an ester of α-hydroxyisobutyric acid or of an alkyl ester of α-hydroxyisobutyric acid with (meth)acrylic acid and, respectively, with a repeat unit of (meth)acrylic acid, and
    further esterifying the ester of α-hydroxyisobutyric acid or of an alkyl ester of α-hydroxyisobutyric acid with from one to four further molecules of α-hydroxyisobutyric acid or of an alkyl ester of α-hydroxyisobutyric acid.

5. The process of claim 1, further comprising:
    removing, by subatmospheric pressure, at least 80% by weight of liberated methacrylic acid, a liberated ester of methacrylic acid, or both together with a residual monomer from the molding composition.

6. The process of claim 1, further comprising:
    removing a residual monomer, a liberated low-molecular-weight compound, or both,
    wherein both the polymer-analogous cleavage and the removing of the monomer, the compound, or both take place in an extruder or polymerization kneader.

7. The process of claim 1,
    wherein the polymer-analogous cleavage is in the presence of a transesterification catalyst.

8. The process of claim 1, wherein the molding composition comprises at least 2% by weight of repeat units of (meth)acrylic acid.

9. The process of claim 1, wherein the molding composition comprises at least 4% by weight of repeat units of (meth)acrylic acid.

10. The process of claim 1, wherein, at least 80% of the repeat units of (meth)acrylic acid in the molding composition are obtained by a process comprising the cleaving.

11. The process of claim 2, wherein the prepolymer is obtained by a process comprising copolymerizing a (meth)acrylate of a methyl ester of α-hydroxyisobutyric acid.

12. The process of claim 3, wherein the esterifying employs a methyl ester of α-hydroxyisobutyric acid.

13. The process of claim 5,
    wherein the removing by subatmospheric pressure comprises removing at least 90% by weight of liberated methacrylic acid, liberated ester of methacrylic acid, or both, together with a residual monomer from the molding composition.

* * * * *